United States Patent [19]

Chaudhuri et al.

[11] Patent Number: 5,051,979
[45] Date of Patent: Sep. 24, 1991

[54] METHOD AND APPARATUS FOR ERRORLESS SWITCHING

[75] Inventors: S. Chaudhuri, East Brunswick; A. Maione, Parlin, both of N.J.

[73] Assignee: AT&T Bell Laboratories, Murray Hill, N.J.

[21] Appl. No.: 545,226

[22] Filed: Jun. 28, 1990

[51] Int. Cl.$^5$ .......................... H04J 1/16; H04J 3/14; H04L 1/02
[52] U.S. Cl. .................. 370/16; 370/105.1; 375/40; 375/100
[58] Field of Search ............... 370/16, 16.1, 100.1, 370/105.2, 105.1, 79; 375/40, 100, 102, 116; 340/825.02, 825.03, 827

[56] References Cited

U.S. PATENT DOCUMENTS

| | | | |
|---|---|---|---|
| 3,628,149 | 12/1971 | Swan | 375/40 |
| 4,246,656 | 1/1981 | Wood et al. | 375/100 |
| 4,368,531 | 1/1983 | Chopping | 370/105.1 |
| 4,380,814 | 4/1983 | Shinmyo | 375/40 |
| 4,395,772 | 7/1983 | Trested, Jr. | 375/40 |
| 4,417,348 | 11/1983 | Abbruscato | 375/40 |
| 4,477,895 | 10/1984 | Casper et al. | 370/16 |
| 4,698,806 | 10/1987 | Graves et al. | 370/105.1 |
| 4,744,095 | 5/1988 | Cornet et al. | 375/100 |

OTHER PUBLICATIONS

Effectiveness of Error Correction and Errorless Frequency Diversity Switching In A Multipath Environment, 1987 IEEE, C. P. Bates, G. L. Frazer, G. D. Martin, and W. C. Trested.
"Digital Hierarchy-Optical Interface Rates and Formats Specifications (SONET)", American National Standard for Telecommunications, pp. 1-110.

Primary Examiner—Douglas W. Olms
Assistant Examiner—H. Kizou
Attorney, Agent, or Firm—Thomas Stafford

[57] ABSTRACT

Errorless switching of digital signals from a service channel is achieved even to an alternate channel, when the signals have a format in which the payload can float within the frame or in which the overhead bytes of the service channel may be different from the overhead bytes of the alternate channel. A preprovisioned delay is provided on the service channel. The amount of delay between corresponding frames containing the same payloads in the digital signals being transported in each channel is measured and added on the alternate channel, thus aligning the channels. The payloads within corresponding frames in the digital signals being transported in each channel are aligned by passing a pointer value indicating the start of the payload of the signal being transported in the service channel to the alternate channel and shifting the payload of the signal being transported in the alternate channel in accordance with the passed pointer value. Once the two signals are frame and paylaod aligned, a switch is made from the signal transported on the service channel to the signal transported on the alternate channel.

18 Claims, 8 Drawing Sheets

5,051,979

METHOD AND APPARATUS FOR ERRORLESS SWITCHING

TECHNICAL FIELD

This invention relates to switching systems and, more particularly, to switching to an alternate channel carried over a diverse route.

BACKGROUND OF THE INVENTION

Errorless protection switching systems, e.g., for digital radio, are known. In these systems, signals carried on a service channel are switched to be carried on an alternate channel upon the detection of a predetermined threshold number of errors at the receiver. To accomplish such a switch, these prior switching systems must compensate for the different transmission delays between the service channel and the alternate channel. In such radio systems, delays are minimized because the service channel and alternate channel traverse the same physical transmission route. Therefore, the differential delay, i.e., the difference in transmission delay between the service channel and the alternate channel, is minimal. Compensation for the differential delay is obtained by employing on each service channel a delay build-out equal to the maximum differential delay, $\Delta$. The delay of the service channel combined with the build-out delay is always greater than the delay inherent in the alternate channel. Furthermore, a variable delay, the length of which ranges from zero to two times the maximum differential delay, can be controllably added to the alternate channel. As a result, a delay can always be added to the alternate channel so that the total delay of the alternate channel is equal to the total delay of the service channel. Therefore, although the alternate channel without build-out delay can be shorter or longer than any given service channel without build-out delay, the total delay of each channel with their respective build-out delays can be equalized. Once delay equality of the channels has been achieved, data may be errorlessly switched from the service channel to the alternate channel.

Such an errorless switching system can only be utilized when the bit stream transported on the alternate channel is identical to the bit stream transported on the service channel. However, when employing a signal format, for example the SONET format, in which the starting location of a payload, i.e., a predetermined unit of data, can float within each frame, the bit streams arriving at the receiver from the service channel and the alternate channel may not be identical. Additionally, the overhead bytes of the signal carried on the alternate channel may be different than the overhead bytes of the signal carried on the service channel, even if the starting location of the payload in corresponding frames is the same. For example, signals originating from a SONET network may need to be rerouted from the service channel to an alternate channel which passes through an intermediate central office. To keep the payload synchronous with the SONET network the payload may be shifted within the frame. In addition, the overhead bytes themselves can be different because some of them may be utilized for auxiliary functions between two network elements, e.g., between the originating element and the added intermediate element through which the signal is rerouted. This would result in the bit streams comprising the signals on the service and alternate channels arriving at the receiving end being different. In such situations, prior errorless switching systems and techniques cannot achieve an errorless switch.

SUMMARY OF THE INVENTION

The problems with errorless switching of signals from the service channel to an alternate channel, when the signals have a format in which the payload can float within the frame or in which the overhead bytes from the alternate channel may be different than those from the service channel, are overcome, in accordance with an aspect of the invention, by preprovisioning a delay on the service channel, aligning the corresponding frames of the service and alternate channels and then aligning the payloads contained within the corresponding frames.

As a first step towards aligning the payloads, the delay between corresponding frames containing the same payloads is measured. The measured amount of delay is added on the alternate channel. Because of the preprovisioned delay on the service channel, delay added to the alternate channel causes the corresponding frames on each of the two channels to be aligned. Thereafter, the payloads within corresponding frames on each channel are aligned by passing a socalled pointer value indicating the start of the payload in the service channel to the alternate channel and shifting the payload of the alternate channel in accordance with the passed pointer value. Once the two signals are frame and payload aligned, a switch is made from the signal carried on the service channel to the signal carried on the alternate channel. If the overhead bytes are not the same, as for example in SONET, the switch must be performed at the start of a new frame. Otherwise, the switch may be performed at any point.

BRIEF DESCRIPTION OF THE DRAWING

In the Drawing.

Shown in FIG. 1 is an example network wherein the signals carried on the service and alternate channels when they arrive at the receiving end may be different.

Figure 3:
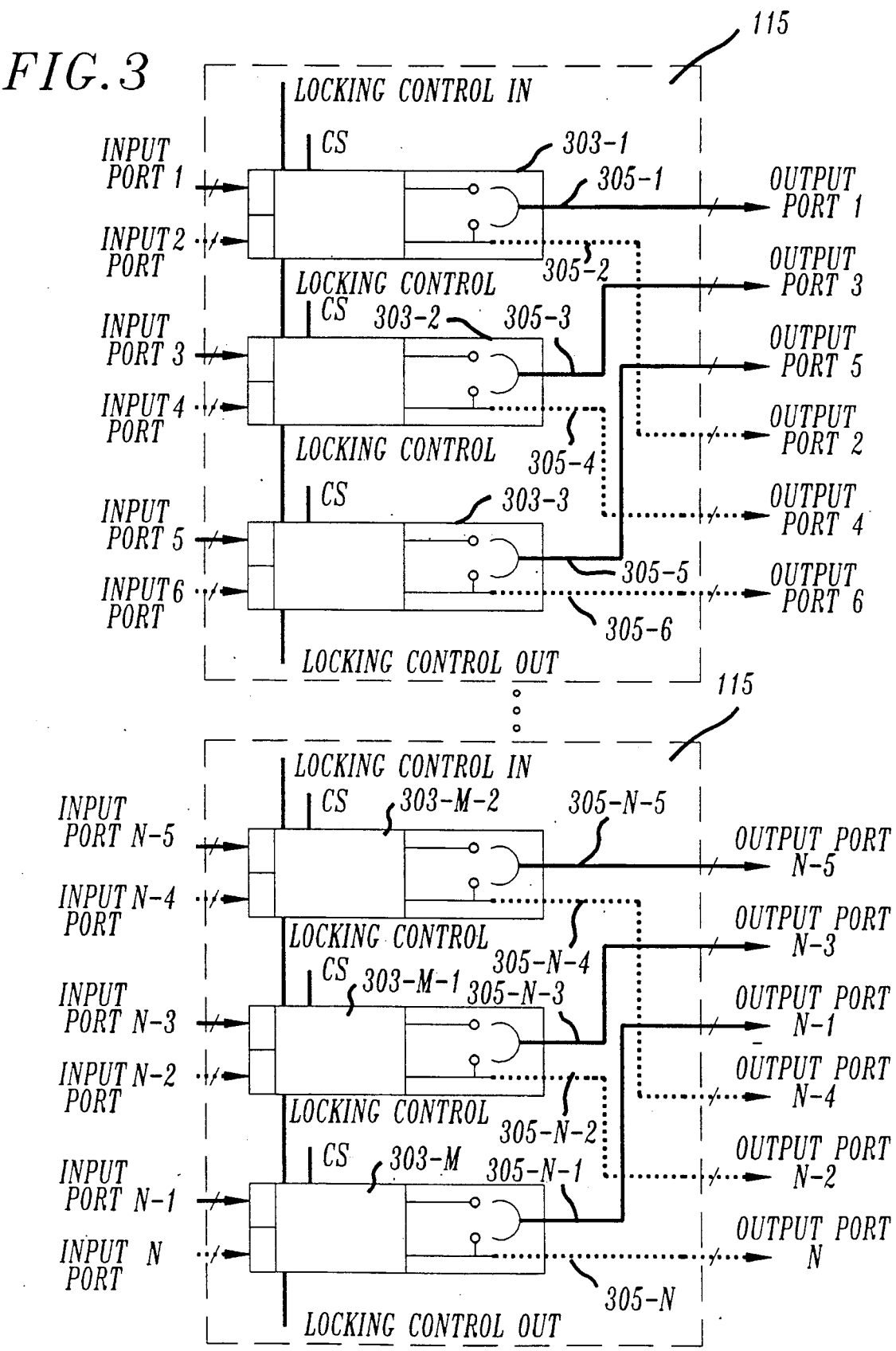
Figure 4:
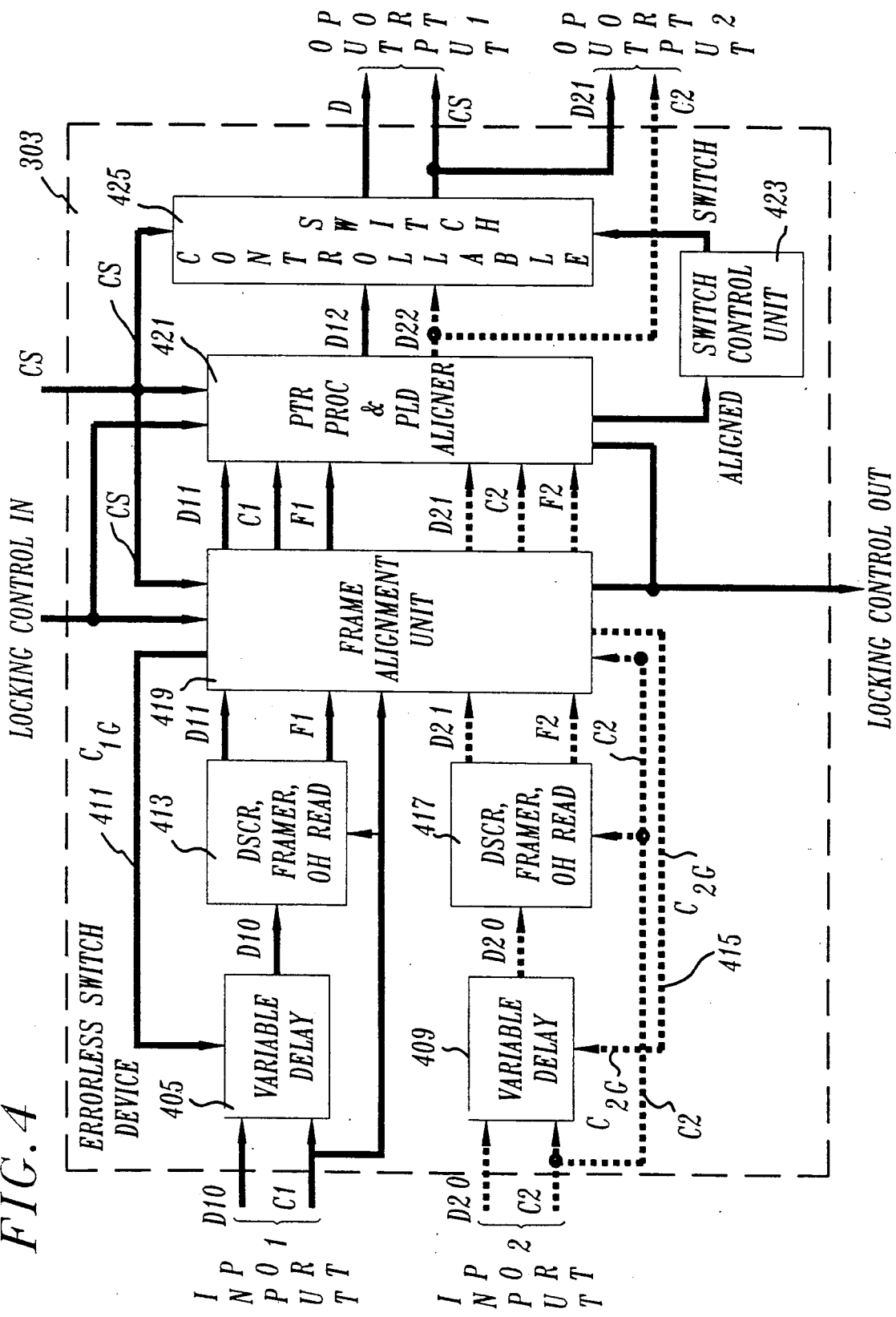
Figure 5:
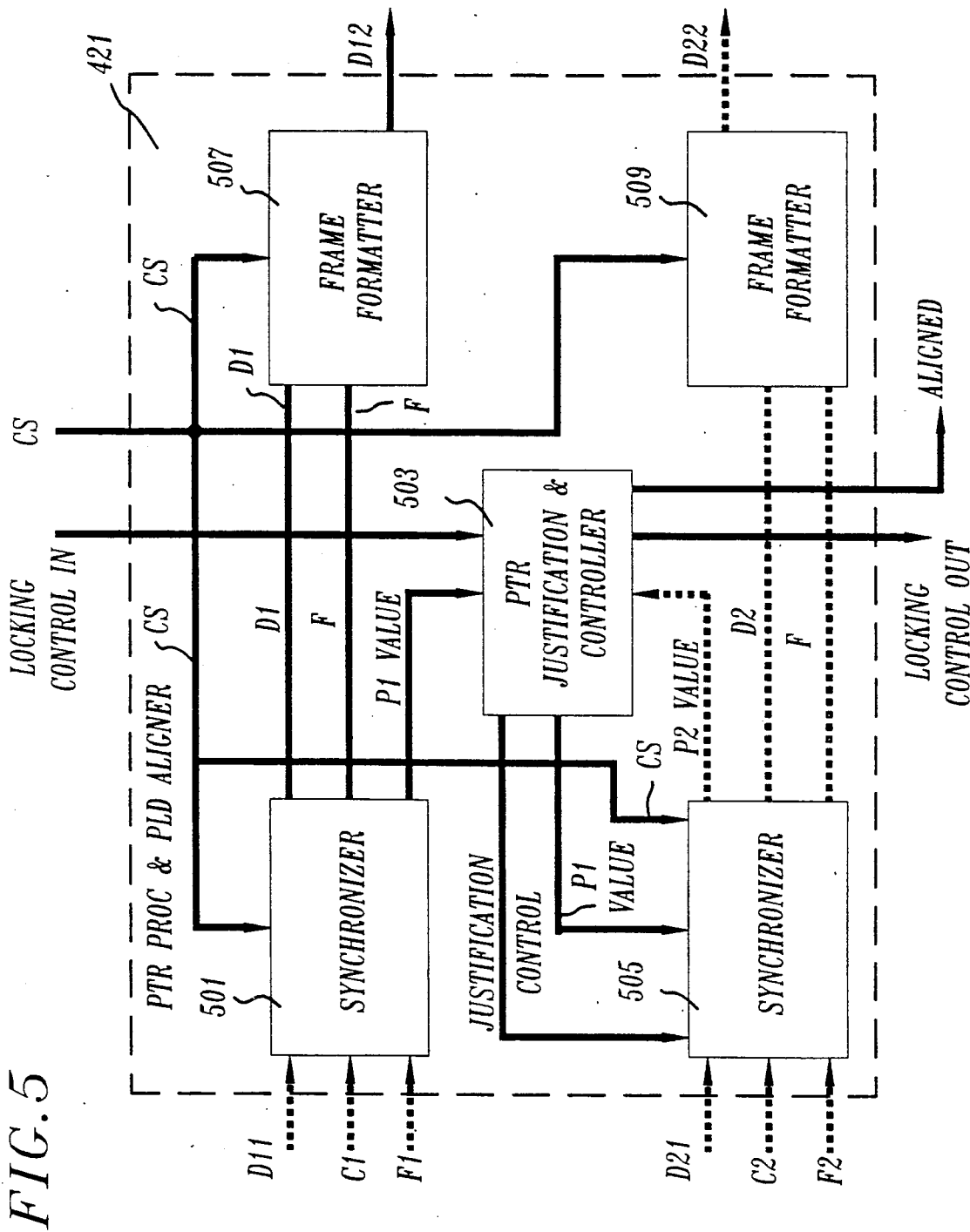

Shown in FIG. 3 is an exemplary high level architecture for errorless switch circuit pack;

Shown in FIG. 4, in simplified block diagram format, is an exemplary implementation of an errorless switching device;

Shown in FIG. 5 is an exemplary pointer processor and payload aligner; and

Figure 6:
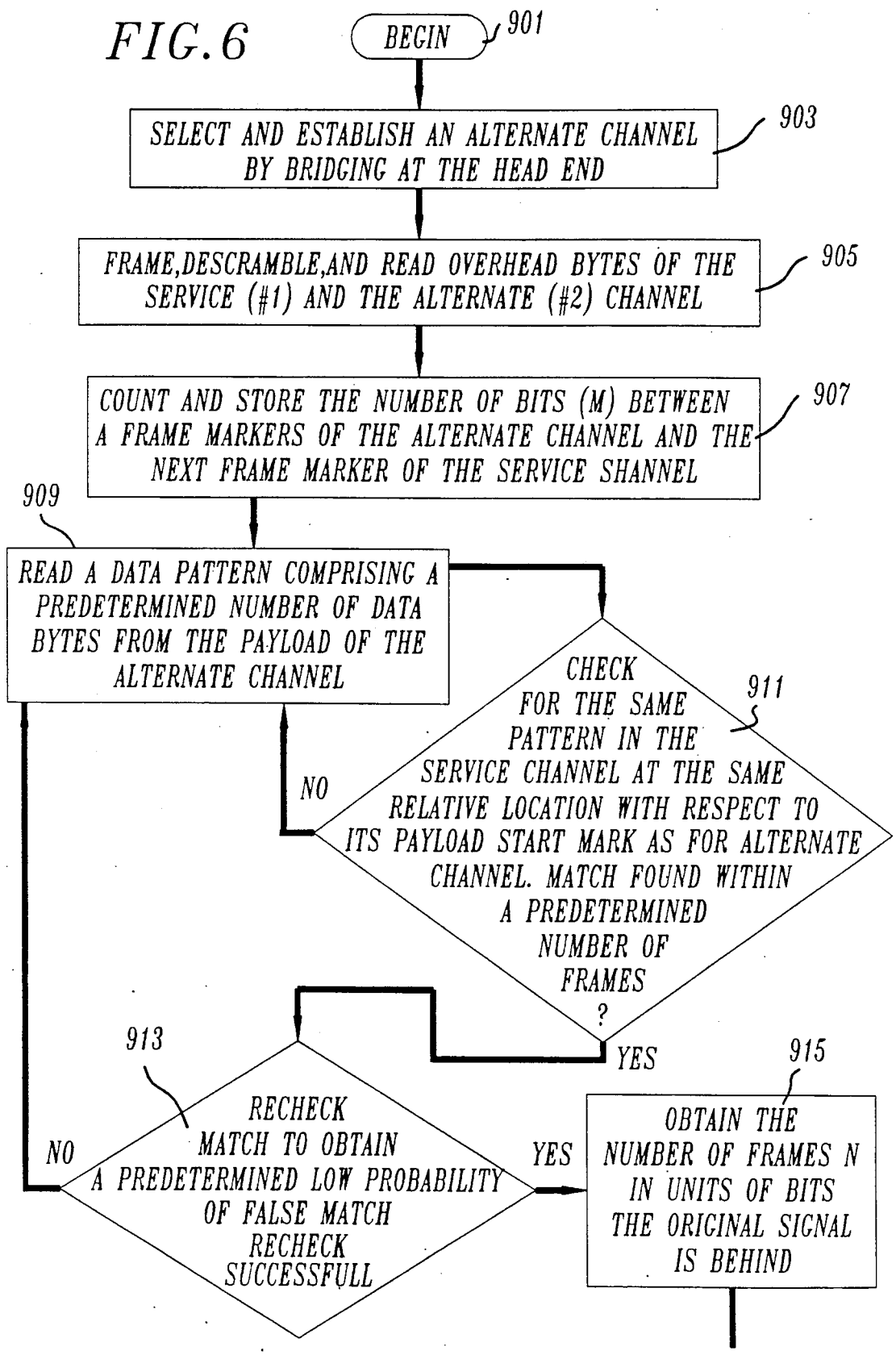
Figure 7:
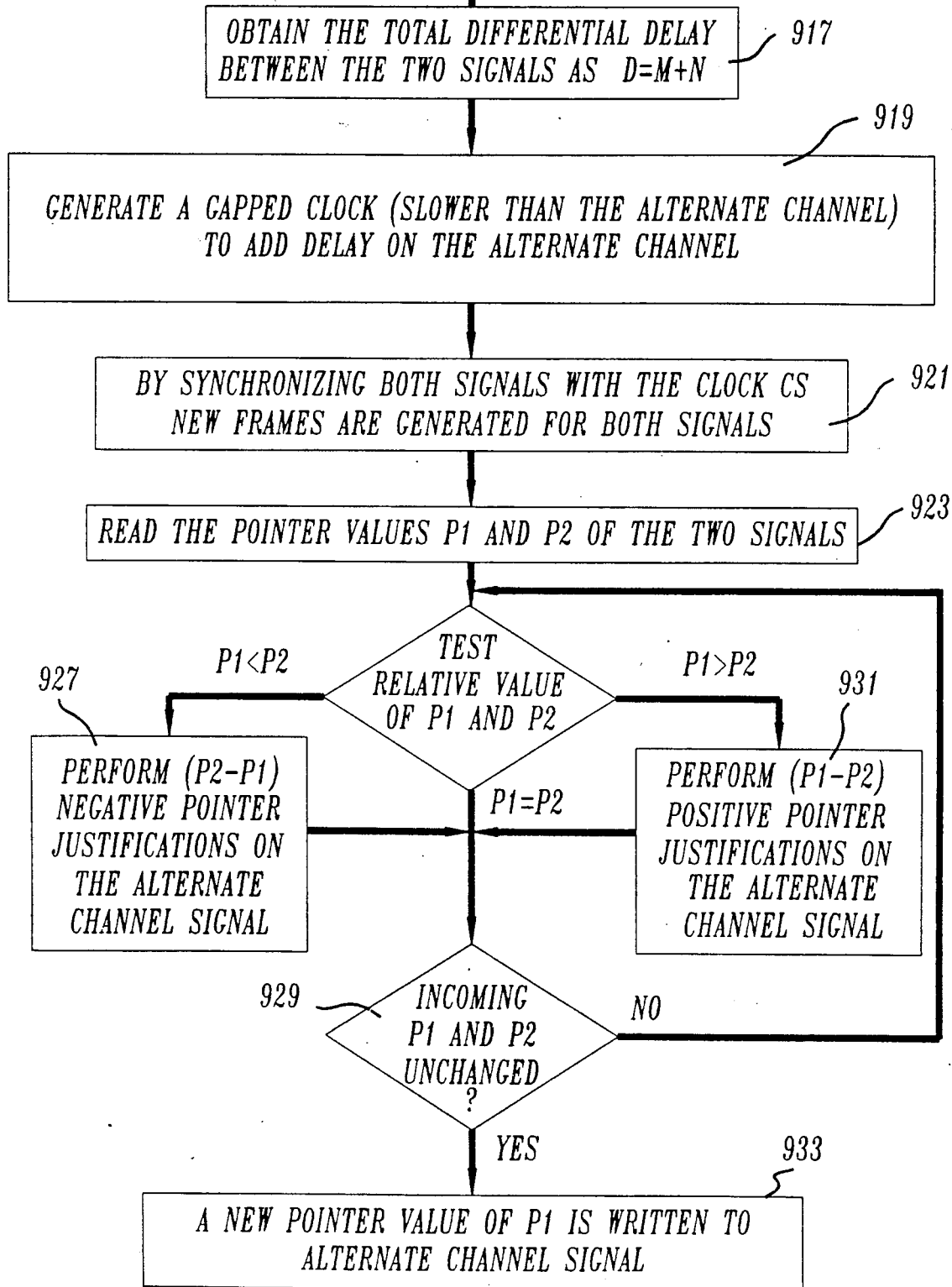
Figure 8:
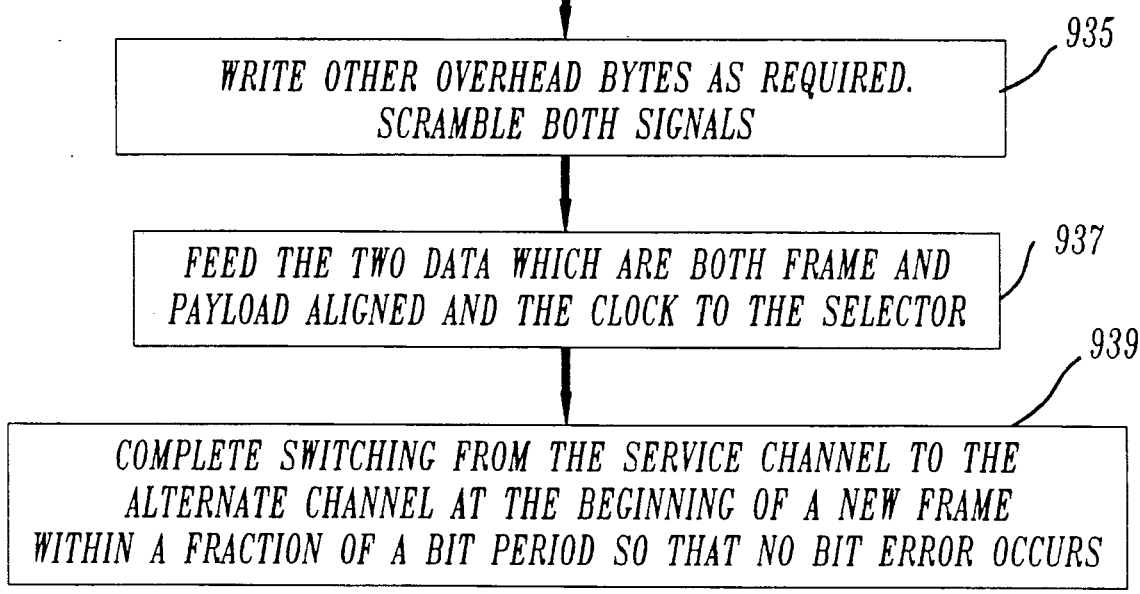
Figure 9:
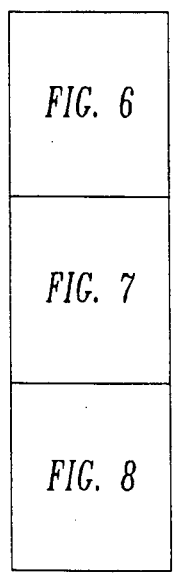

FIGS. 6, 7, and 8 when connected as shown in FIG. 9 form a flow diagram of the operations required to perform an errorless switch.

DETAILED DESCRIPTION

Figure 1:
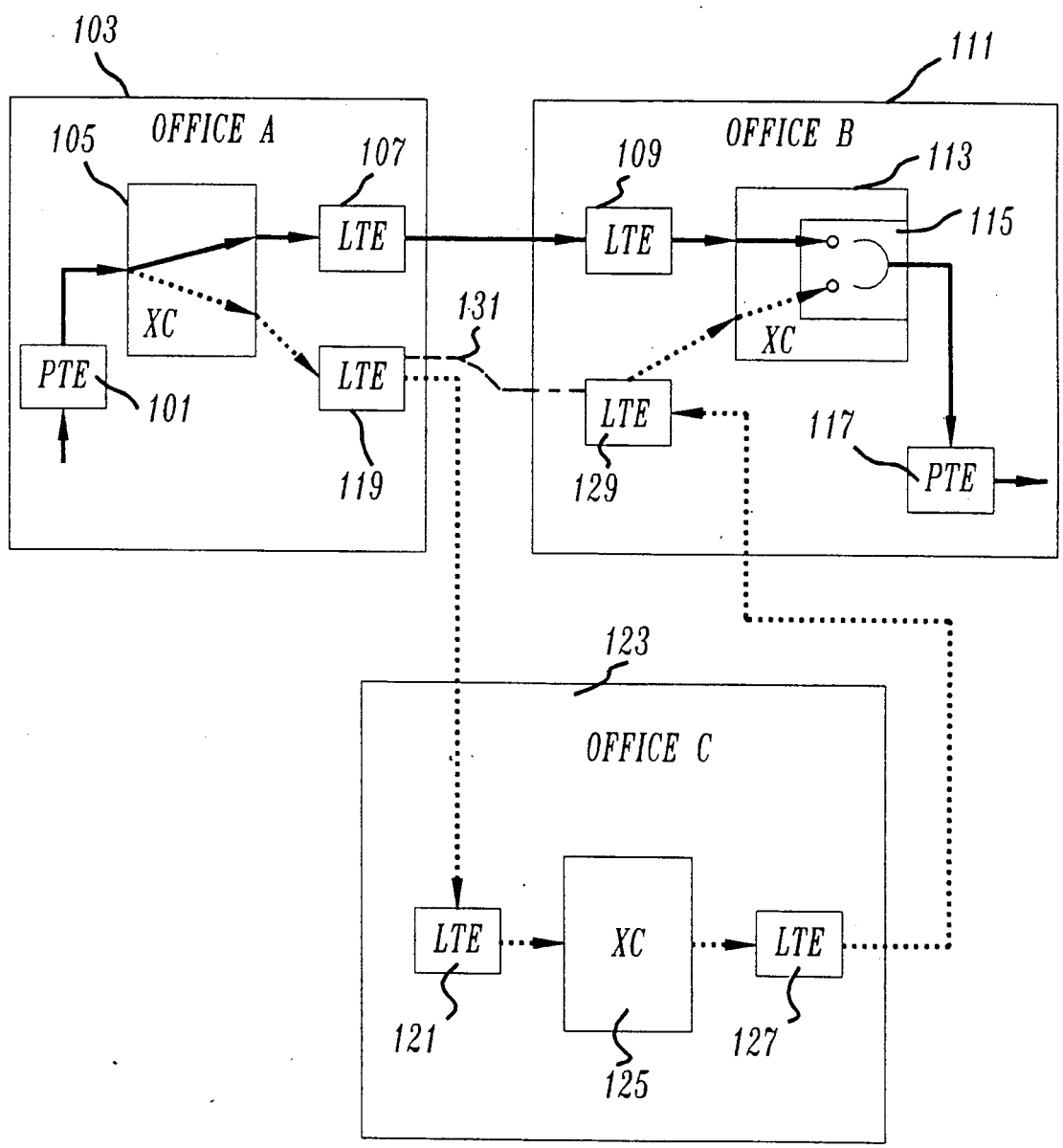

Shown in FIG. 1 is an example network wherein the signals carried on the service and alternate channels when they arrive at the receiving (tail) end may be different. Notwithstanding the possibilities of such differences, errorless switching of the signal carried on the service channel to an alternate channel can be performed. A signal originating at path terminating element (PTE) 101 in office (A) 103 is supplied to cross-connect (XC) system 105. Under typical operating conditions, cross-connect system 105 cross-connects the signal to line terminating equipment (LTE) 107 and causes it to be transported to line terminating equipment (LTE) 109 in office (B) 111. From line terminating equipment 109 the signal passes to cross-connect 113 which is equipped with errorless switch circuit pack 115. The output from errorless switch circuit pack 115 is supplied to path terminating element (PTE) 117 where it is terminated. The delineated path over which the signal travels from cross-connect system 105 to cross-connect system 113 comprises the service channel. When it is determined that an errorless switch to an alternate channel for the aforementioned signal is required, an additional path (shown in dot outline) through cross-connect system 105 is established to line terminating equipment (LTE) 119. This additional path thus bridges the signal from path terminating element 101 to line terminating equipment 119, i.e., a head end bridge is established for the alternate channel. From line terminating equipment 119 the signal is transported to line terminating equipment 121 of office (C) 123. The signal is cross-connected through cross-connect system 125 to line terminating equipment 127 from which it is transported to line terminating equipment (LTE) 129 of office (B) 111. The signal in the alternate channel passes from line terminating equipment 129 to cross-connect system 113. The alternate channel is transported over the delineated path noted above which is entirely distinct from the physical path of the service channel. In office (B) 111 the desired errorless switch is accomplished by means of errorless switch circuit pack 115. Upon completion of the errorless switch, the resulting signal, derived from the alternate channel, is thereafter supplied to path terminating element 117 which remains unaware that any switching activity has occured. It should be noted that any alternate route available from office (A) 103 to office (B) 111 is acceptable as an alternate channel. The route of the alternate channel need not be fixed until it is determined that an errorless switch is required. Although this example shows the routing of an alternate channel from office (A) 103 over an indirect route to destination office (B) 111, use of this technique is not precluded when the alternate channel is routed over an available channel directly connecting office (A) 103 to office (B) 111, such as channel 131. Although in this example errorless switch circuit pack 115 is shown as a part of cross-connect system 113, such a circuit pack may also be included in other network elements.

Figure 2:
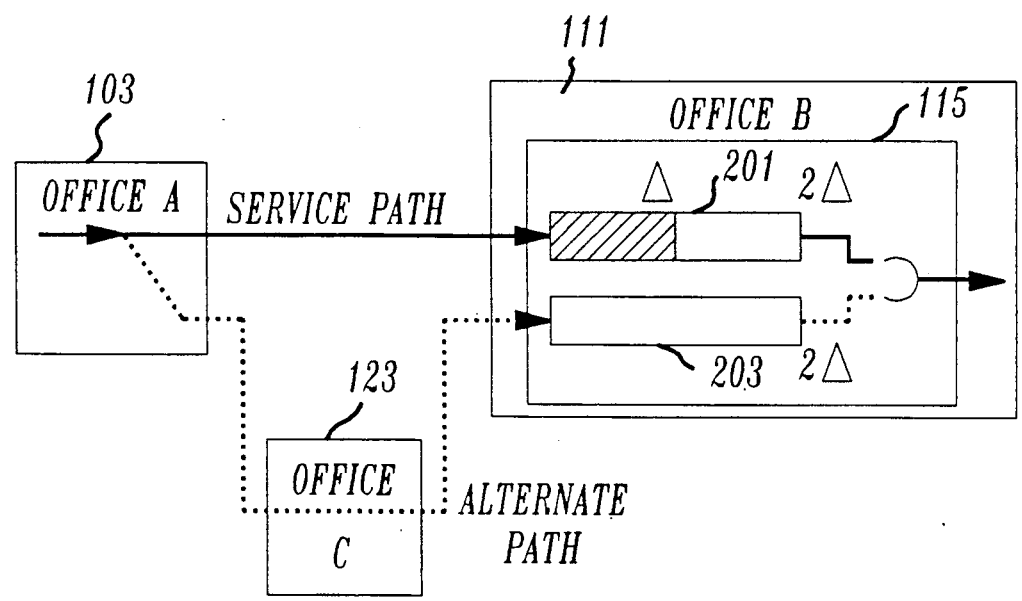
FIG. 2 shows an alternate high level view of the network shown in FIG. 1.

FIG. 2 shows an alternate high level view of the network shown in FIG. 1. This alternate view focuses on the delays that are required to be preprovisioned in the errorless switch node, office (B) 111. Because of the nature of modern high speed communication systems and the large differential delay that can arise if a diverse route is used for the alternate channel, it is typically necessary to preprovision a delay on the service channel. The delay employed on the service channel 201 is set equal to the maximum differential delay between the service channel and the alternate channel, $\Delta$. As in prior systems, the delay of the service channel combined with the preprovisioned delay is always greater than the delay inherent in the alternate channel. It is imperative that the delay be preprovisioned if large differences in path delay between the service channel and the alternate channel are to be accommodated. This is because a large change of delay on the service channel could cause either the signal transported by the service channel to degrade or lose data. Implementations of the service channel, however, typically allow addition of up to twice the maximum differential delay, $\Delta$, although only one time the maximum differential delay is actually provisioned. The ability to add extra delay is provided so that any channel be used as either as a service channel or as an alternate channel. Additionally, a variable delay 203, the duration of which ranges from zero to two times the maximum differential delay, i.e., $2\Delta$, can be controllably added to the alternate channel. As a result, a delay can always be added to the alternate channel so that the total delay of the alternate channel is equal to the total delay of the service channel. Therefore, although the delay of the alternate channel without build-out delay can be shorter or longer than the delay of any given service channel without build-out delay, the total delay of the channels can be equalized by use of their respective build-out delays.

Shown in FIG. 3 is an exemplary high level architecture for errorless switch circuit pack 115 (FIG. 1). Channels, are supplied to input ports 1, 2, . . . , N of errorless switch circuit pack 115. The channels are grouped into pairs and each pair is supplied to one of errorless switch devices 303-1 through 303-M where $M=N/2$. Each channel typically carries a signal comprised of a data signal and a clock signal. The operation of each of errorless switch devices 303 will be described further below. Each of errorless switch devices 303 can operate in one of three modes. In the first mode, each of errorless switch devices 303 operates as an independent errorless switch and output interface for cross-connect system 113 (FIG. 1). Similarly, in the second mode, each of errorless switch devices 303 operates as a synchronized errorless switch and output interface for cross-connect system 113. In the third mode, each of errorless switch devices operates as a dual channel output interface for cross-connect system 113. The second and third modes, as well as the function of LOCKING CONTROL signals will be discussed in further detail below. The mode of each of errorless switch devices can be individually determined by the user through a control mechanism (not shown). Output ports 305-1 through 305-N of errorless switch devices 303 are subsequently supplied to either path terminating equipment or line terminating equipment depending upon the configuration of the system. Also, clock CS is supplied by a source external errorless switch devices 303, e.g., by cross-connect system 113. Signals supplied as outputs from each of output ports 1 through N of errorless switch devices 303 are synchronized to clock CS.

Shown in FIG. 4, in simplified block diagram format, is an exemplary implementation of one of errorless switch devices 303 (FIG. 3). The signals transported on a service channel comprising data stream D10 and clock C1 are supplied via input port 1 to variable delay 405. If the cross-connect system 113 (FIG. 1) does not provide clock C1, then clock C1 may be derived from data D10 through well known methods of timing recovery. This recovery would be performed by additional clock recovery circuitry (not shown) that may be incorporated into each of errorless switch devices 303. The data D10 is written into variable delay 405 at a rate determined by clock C1. Also, the signals transported on an alternate channel comprising data D20 and clock C2 are supplied via input port 2 to variable delay 409. The data D20 is written into variable delay 409 at a rate determined by clock C2. Variable delays 405 and 409 have been provisioned, in accordance with an aspect of the invention, and may be implemented through the use of elastic stores. Data from variable delay 405 is retrieved at a rate determined by controllably gapped clock $C_{1G}$ on circuit path 411 and is supplied to descrambler (DSCR), framer, and overhead (OH) read unit 413. A controllably gapped clock for retrieving data is a clock the frequency of which can controllably be set less than or equal to the clock writing in the data. Controllably gapped clocks are well known in the art. Similarly, data from variable delay 409 is retrieved at a rate determined by gapped clock $C_{2G}$ 415 and supplied to descrambler (DSCR), framer, and overhead (OH) read unit 417. The gapped clocks $C_{1G}$ and $C_{2G}$ are supplied by frame alignment unit 419. The function of descrambler (DSCR), framer, and overhead (OH) reads units 413 and 417 is to perform any descrambling that is required, to locate and identify the frame markers, i.e., the beginning of each frame, and to read and extract overhead information required for further processing. Descrambler (DSCR), framer and overhead (OH) read unit 413 supplies descrambled data stream D11 and start of frame signal F1 to frame alignment unit 419. Likewise, descrambled data stream D21 and start of frame signal F2 are supplied by descrambler (DSCR), framer and overhead (OH) read unit 417 to frame alignment unit 419. Frame alignment unit 419 compares the data signal D21 derived from the signal transported on the alternate channel for a frame that corresponds to a predetermined frame on data signal D11 derived from the signal transported on the service channel in order to determine the differential delay between the service channel and the alternate channel. This differential delay information is then used to align the corresponding frames of the service channel and the alternate channel. This alignment is performed by controlling the variable delay from the alternate channel via the gapped clock $C_{2G}$ which is derived by frame alignment unit 419 from clock C2. Signals D11, C1, F1, D21, C2 and F2 are passed through frame alignment unit 419 to pointer (PTR) processor (PROC) and payload (PLD) aligner. Pointer (PTR) processor (PROC) and payload (PLD) aligner 421 synchronizes data signals D11 and D21 are aligned and appropriate pointer values are written into new data streams D12 and D22. Pointer (PTR) processor (PROC) and payload (PLD) aligner 421 is discussed in further detail below in conjunction with FIG. 5. Additionally, pointer (PTR) processor (PROC) and payload (PLD) aligner 421 supplies an alignment indicator channel to switch control unit 423. LOCKING CONTROL IN signal and LOCKING CONTROL OUT, are ignored unless one of errorless switch devices 303 (FIG. 3) is operated in the second mode as a synchronized errorless switch mentioned above and described in further detail below. Upon receipt of an alignment indication, switch control unit in conjunction with any other inputs (not shown) supplies as an output a command to controllable switch 425 to switch from supplying data stream D12 as its output D to supplying data stream D22 as its output D. Additionally, controllable switch 425 supplies clock CS as its output clock C.

Shown in FIG. 5 is an exemplary implementation of pointer (PTR) processor (PROC) and payload (PLD) aligner 421 (FIG. 4). Synchronizer 501 is supplied with data signal D11, clock C1, start of frame signal F1 and clock CS. Synchronizer 501 generates new frames containing the payload data that has been extracted from signal D11 and synchronized with clock CS. During the synchronization process the value of the pointer, P1, that points to the start of the payload data may have been changed. The new value of pointer P1 is supplied to pointer (PTR) justification and controller unit 503. Similarly, synchronizer 505 is supplied with data signal D21, clock C2, start of frame signal F2 and clock CS. Synchronizer 505 is also supplied with the value of pointer P1 and a justification control signal from pointer (PTR) justification and controller 503. Synchronizer 505 generates new frames containing the data that has been extracted from signal D21 and synchronizes these new frames with clock CS. Again, during the synchronization process, the value of pointer P2 that points to the start of the payload data may have been changed. In accordance with an aspect of the invention, it is the new value of pointer P2 that is supplied to pointer (PTR) justification and controller 503. More importantly, and again, in accordance with an aspect of the invention, the payload data extracted from signal D21 is inserted in the frame generated for data D21 in the location indicated by the pointer value P1. Pointer (PTR) justification and controller 503 provides to synchronizer 505 the necessary positive or negative justification control signal depending on the relative values of P1 and P2. When the justification process is completed, the value of P1 and P2 are equal and therefore the payloads are aligned. Upon achieving alignment, pointer (PTR) justification and control unit 503 supplies as an output ALIGNMENT indication to switch control unit 423 (FIG. 4).

Data D1, start of frame signal F, and clock CS are supplied to frame formatter 507 which writes into the frame the necessary overhead bytes. These overhead bytes may include but are not limited to: framing pattern, parity and maintenance information. Additionally, frame formatter 507 performs any necessary scrambling of any parts of the completed frame that is required. The final form of the frame is supplied as an output D12 to controllable switch 425. In a similar manner, data D2, start of frame signal F and clock CS are supplied to frame formatter 509 which writes into the frame the necessary overhead bytes. Additionally, frame formatter 509 scrambles any parts of the completed frame for which scrambling is required. The final frame is supplied as output D22 to error free switch 425. Upon receipt of a switch indication from switch control unit 423 (FIG. 4), controllable switch 425 completes the switching process by switching its output D from D12 to D22.

FIGS. 6, 7, and 8 when connected as shown in FIG. 9 form a flow diagram of the operations required to perform an errorless switch. When it is determined that an errorless switch from one facility to another is required, the routine is entered via step 901. An alternate channel is selected and established by bridging at the head end of the signal in step 903. One example of such an alternate channel is the channel through office (C) 123 (FIG. 1) as described above. This may be accomplished by cross-connecting at the receiver node and, in addition, it may be necessary to cross-connect at intermediate nodes. The alternate channel is provisioned with variable delay 409 with a capacity for twice the maximum differential path delay, 2Δ. In step 905, for the signal carried on each channel, frame markers are identified and located, any descrambling that is required is performed and the overhead bytes are read. The functionality of this step is performed by descrambler (DSCR), framer, and overhead (OH) read unit 413 (FIG. 4) and 417. Then, in step 907 the number of bits between a frame marker of the signal carried transported by the alternate channel and the next frame marker of the signal carried transported by the service channel, M, is counted and stored. A data pattern comprising a predetermined number of data bytes from the payload of the alternate channel is read in step 909. The data bytes that are selected should not be any bytes that are known to repeat in a characteristic fashion in a series of frames, such as path overhead bytes or stuff bytes. Such a selection is necessary to prevent false matching. Because of the preprovisioning of the delay on the service channel it is known that the service channel is longer than the alternate channel. Therefore, the frames containing the payload of the alternate channel are ahead of the corresponding frames of the service channel. Control is then passed to conditional branch point 911 which checks for the same data pattern on the service channel at the same relative location with respect to its payload start mark as the data pattern previously read in step 909 from the alternate channel. If the same pattern is not found within a predetermined number of frames, control is passed back to step 909 and data from a new frame supplied from the alternate channel is sampled. If the same pattern is found in step 911 control is passed to step 913 which rechecks the match to achieve the predetermined probability that the match is a true match. If the recheck in step 913 is not successful control is passed back to step 909 to initiate a new search. The probability of false matching is reinitialized. If the recheck in step 913 is successful, control is passed to step 915 which obtains the number of frames that the service channel is behind the alternate channel. This method of searching of corresponding data patterns minimizes the required number of comparisons and hence minimizes the probability of false matching. The number of frames is translated into the corresponding number of bits N. In step 917, M and N are added to obtain D, the total number of bit time units in the differential delay between the two channels. A gapped clock is generated in step 919 to add a delay to the alternate channel by an amount of D bits. Steps 909 through 919 are accomplished by frame alignment unit 419 (FIG. 4)

New frames are generated for both channels by synchronizing both channels with clock CS in step 921. Next, in step 923, the pointer values of each of the two channels is read. The pointer of the service channel is P1 and the pointer of the alternate channel is P2. These pointers indicate the start of the payloads within each of the corresponding frames after the two data signals are time synchronized. Control is then passed to conditional branch point 925 which tests the relative values of P1 and P2. If the test result in step 925 is that P1 is less than P2 control is passed to step 927 which performs negative pointer justifications on the signal supplied from the alternate channel. For example, in SONET, a negative justification is performed by shifting the payload backward and placing an extra data byte into a stuff byte location. The number of bytes shifted in the negative pointer justification is equal to the value of P2 minus the value of P1. Control is then passed to step 929. If the test result in step 925 is that P1 is greater than P2 control is passed to step 931 which performs positive pointer justifications on the signal supplied from the alternate channel. Again, for example, in SONET positive justifications are performed by shifting the payload forward and any resulting empty byte is filled with a stuff value. The number of bytes shifted in the positive pointer justification is equal to the value of P1 minus the value of P2. Control is then passed to step 929. If the test result in step 925 is that P1 is equal to P2 control is passed directly to step 929. Conditional branch point 929 test whether incoming pointers P1 and P2 have remained unchanged during the payload alignment process. If the test result in step 929 is no, control is passed back to step 925. This is required because the payload alignment previously performed has become invalidated by the change in either P1 or P2. If the test result in step 929 is yes, control is passed to step 933 which writes a new pointer value of P1 in the appropriate overhead bytes of the signal supplied from the alternate channel. Steps 921 through 933 are performed by pointer (PTR) processor (PROC) and payload (PLD) aligner 421 (FIG. 4).

In step 935, the values of any remaining overhead bytes that must be recalculated are recalculated. Then, all the overhead bytes are written to the appropriate locations in both channels. Both sets of new signals are scrambled, if necessary. This operation is performed by frame formatters 507 (FIG. 5) and 509. The resulting signals which are now both frame aligned and payload aligned are fed to controllable switch 425 (FIG. 4) in step 937. Finally, in step 939, the errorless switching process is completed by switching from the service to the alternate channel at the beginning of a new frame within a fraction of a bit period so that no bit error occurs. If the overhead bytes are not the same, as for example in SONET, the switch must be performed at the start of a new frame. This is because the frame of the alternated channel that was switched to is not identical with the frame of the service channel that was switched from. Thus, although each frame itself is valid and carrying all the information required at the termination for error free reception, a changeover in the middle could cause errors. For example, error checking systems might fail because the received checksum will be for a single frame of the alternate channel signal while the checksum computed at the termination would be based partly on the alternate channel signal and partly on the service channel signal. The two checksums would not match as required for error free operation, since they were calculated based on different data, and an error condition would result. If the overhead bytes are the same the signals have become identical so that the errorless switch may be performed at any time.

Returning to FIG. 3, another aspect of the invention incorporated into this architecture is the ability to errorlessly switch a higher rate signal than each of the errorless switch devices can individually accommodate. In this example, errorless switch devices 303-1, 303-2 and 303-3 are collected together as a group to errorlessly switch to an alternate channel three lower rate signals which together comprise one higher rate signal originally carried on a single service channel. For example, in SONET, each individual signal may be 51.84 Mb/s rate. However, the next higher rate signal in the SONET signal hierarchy is 155.52 Mb/s. The 155.52 Mb/s can be split into three tributary 51.84 Mb/s signals using a demultiplexor (not shown) employing byte disinterleaving techniques which are well known. Each tributary of the 155.52 Mb/s service channel is supplied to the odd numbered input of one of errorless switch devices 303. The corresponding tributaries of the 155.52 Mb/s alternate channel are supplied to the even numbered input of the corresponding ones of errorless switch devices 303. The three errorless switch devices operate in their second mode such that they are synchronized to each other and each performs a synchronized errorless switch for its tributary signals. The synchronization is accomplished by means of LOCKING CONTROL signals that are passed from errorless switch device 303-1 to errorless switch devices 303-2 and 303-3. Errorless switch devices 303-2 and 303-3 are to be synchronized with errorless switch device 303-1. The LOCKING CONTROL signals can be seen more clearly in FIG. 4. LOCKING CONTROL OUT signals are supplied from pointer (PTR) processor (PROC) and payload (PLD) aligner 421 and frame alignment unit 419. These LOCKING CONTROL OUT signals are supplied via signal lead LOCKING CONTROL IN to frame alignment unit 419 and pointer (PTR) processor (PROC) and payload (PLD) aligner 421. In one implementation of pointer (PTR) processor (PROC) and payload (PLD) aligner 421, LOCKING CONTROL signals are supplied to and generated by pointer (PTR) justification and controller 503 (FIG. 5). After the errorless switch of each of the three tributary signals, the tributary signals are reconstructed into a single 155.52 Mb/s signal by a multiplexer (not shown) utilizing the inverse of the byte disinterleaving techniques employed.

In the third mode of operation of one of errorless switch devices 303 (FIG. 3), no errorless switch is performed. This mode of operation is selected by a control mechanism (not shown). The signals carried on each channel supplied to the input ports of one of errorless switch devices 303 are synchronized to clock CS but are neither frame aligned nor payload aligned. To prevent pointer justifications from being performed, pointer (PTR) justification and controller unit 503 (FIG. 5) is disabled by a control mechanism (not shown). Therefore, resulting synchronized data signals D12 and D22 (FIG. 4) carry independent signals, i.e., signals not derived from a single original source. Each synchronized signal is independently supplied, along with clock CS, as an output to its corresponding output port.

We claim:

1. In a receiver, a method for errorless switching from a first digital signal comprising a first series of frames in which a first series of payloads is being transported in a first channel, to a second digital signal comprising a second series of frames in which a second series of payloads identical to said first series of payloads is being transported in a second channel, said second series of frames having starting locations, for particular ones of said second series of payloads, that can be different from starting locations of identical particular payloads, in said first series of frames, comprising the steps of:

preprovisioning a first delay on said first channel such that said first channel has a total delay including said first delay greater than an actual delay of said second channel;

aligning each frame of said first digital signal to a corresponding frame of said second digital signal so that each of said corresponding frames has a starting location for an identical particular payload from each of said first and second series of payloads;

aligning said starting location and any subsequent locations of particular ones of said second series of payloads within said second series of frames to the starting location and any subsequent locations of identical particular ones of said first series of payloads within said first series of frames;

making a determination to switch from said first digital signal to said second digital signal; and switching in response to said determination from said first digital signal to said second digital signal without loss of a single bit.

2. The method as defined in claim 1 wherein said step of aligning each frame includes the steps of:

measuring the difference in delay between frames of said first digital signal and corresponding frames of said second digital signal; and adding a delay to said second channel equal to said measured difference in delay.

3. The method as defined in claim 2 wherein said step of measuring includes the step of determining to within a predetermined probability which frame of said first digital signal corresponds with a frame of said second digital signal.

4. The method as defined in claim 3 wherein said step of determining includes the steps of:

a. obtaining a data pattern by reading a first predetermined number of data bytes from a predetermined location of a payload of a particular frame of said second digital signal;

b. checking each payload of each successive frame of said first digital signal only at an identical predetermined location as was read in step (a) and counting each frame having a payload that is checked until a match to said data pattern is found or until a predetermined duration has passed;

c. if a predetermined duration has passed going back to step (a) and repeating steps (a) through (c);

d. if said match in step (b) is found obtaining said frame count which indicates a number of frames that said first digital signal is delayed behind said second digital signal;

e. obtaining another data pattern by reading a second predetermined number of data bytes from a predetermined location of a payload of another particular frame of said second digital signal;

f. checking a payload in a frame of said first digital signal which is delayed by said obtained frame count relative to said frame of said second digital signal from which said data pattern was obtained in step (e) for a match, to said data pattern obtained in step (e), only at said predetermined location from which said data bytes were read in step (e);

g. if a match is not found in step (f), going back to step (a), and repeating steps (a) through (g);

h. if a match is found in step (f), repeating steps (e) through (g) a predetermined number of times; and i. supplying as an output said frame count as a frame delay indication in units of frames.

5. The method as defined in claim 3 wherein said step of determining includes the steps of counting a number of bits from a start of frame indication of said second signal until an immediately following start of frame indication of said first signal and supplying as an output said number as a frame offset indication in units of bits.

6. The method as defined in claim 3 wherein said step of determining includes the steps of converting a frame delay indication from an indication in units of frames to an indication in units of bits and adding said frame delay indication in units of bits to a frame offset indication in units of bits to obtain said difference in delay.

7. The method as defined in claim 1 wherein said step of aligning said starting location includes the steps of:

j. generating third and fourth digital signals each comprising a series of frames of identical type as said frames comprising said first or second digital signals, wherein said third digital signal is transporting a third series of payloads identical to those transported by said first digital signal and said fourth digital signal is transporting a third series of payloads identical to those transported by said second digital signal, and said third and fourth digital signals being time synchronized;

k. reading from frames of each of said third and fourth digital signals a pointer value indicating a starting location within respective ones of said frames of a particular payload which is identical in each of said third and fourth series of payloads;

l. performing pointer justifications on said fourth digital signal by shifting said starting location and subsequent locations of each payload in said fourth digital signal by an amount reflective of the difference between each of said pointer values read in step (k);

m. obtaining a new pointer value for said fourth digital signal so that said new pointer value corresponds with said shifted starting location;

n. rechecking said pointer values of said third and fourth digital signals;

o. if said pointer values have change going back to step (k) and repeating steps (k) through (o); and v. if said pointer values remain unchanged writing said new pointer value to said fourth digital signal.

8. The method as defined in claim 7 further including the steps of:

writing overhead bytes as required to each of said third and fourth digital signals;

scrambling, as required, each of said third and fourth digital signals; and supplying as outputs said third and fourth signals to a signal selector.

9. The method as defined in claim 1 further including the steps of dividing said first digital signal using a byte disinterleaving technique into a first plurality of signals and dividing second digital signal using said byte disinterleaving technique into a second of plurality of signals, a step of errorlessly switching in a synchronized manner corresponding ones of said first and second plurality of signals thereby supplying a third plurality of signals and a step of combining said third plurality of signals into a third signal using an inverse of said byte disinterleaving technique.

10. Apparatus in a receiver for errorless switching from a first digital signal comprising a first series of frames in which a first series of payloads is being transported in a first channel, to a second digital signal comprising a second series of frames in which a second series of payloads identical to said first series of payloads is being transported in a second channel, said second series of frames having starting locations, for particular ones of said second series of payloads, that can be different from starting locations of identical particular payloads, in said first series of frames, comprising:

means for providing a first delay on said first channel such that said first channel has a total delay including said first delay greater than an actual delay of said second channel;

means for aligning each frame of said first digital signal to a corresponding frame of said second digital signal such that each of said corresponding frames has a starting location for an identical particular payload from each of said first and second series of payloads;

means responsive to said aligned frames for aligning said starting location and any subsequent locations of particular ones of said second series of payloads within said second series of frames to the starting location and any subsequent locations of identical particular ones of said first series of payloads within said first series of frames;

means for determining to switch from said first digital signal to said second digital signal; and means for switching, from said first digital signal to said second digital signal without loss of a single bit, responsive to said means for determining to switch.

11. The apparatus as defined in claim 10 wherein said means for aligning each frame includes:

means for measuring the difference in delay between frames of said first digital signal and corresponding frames of said second digital signal; and means for adding a delay to said second channel equal to said measured difference in delay.

12. The apparatus as defined in claim 11 wherein said means for measuring includes means for determining to within a predetermined probability which frame of said first digital signal corresponds with a frame of said second digital signal.

13. The apparatus as defined in claim 12 wherein said means for determining to within a predetermined probability includes:

means for obtaining a data pattern by reading a first predetermined number of data bytes from a predetermined location of a payload of a particular frame of said second digital signal;

means for checking each payload of each successive frame of said first digital signal only at an identical predetermined location as was read by said means for obtaining a data pattern and counting each frame having a payload that is checked until a match to said data pattern is found or until a predetermined duration has passed;

means for supplying as an output a frame count indicating the number of frames of said first digital signal that were counted by said means for checking and counting until a match was found;

means for restarting and reinitializing said means for checking and counting if a predetermined duration has passed;

means for obtaining data patterns repeatedly for a predetermined number of times by reading a second predetermined number of data bytes from a predetermined location of each payload of predetermined particular frames of said second digital signal;

means for repeatedly checking for said predetermined number of times a frame in said first digital signal which is delayed by said obtained frame count behind a corresponding frame in said second digital signal from which said data pattern was obtained, said checking being performed only at identical predetermined locations as were read by said means for obtaining data patterns repeatedly for a match to said data patterns and supplying as an output a match indication;

means responsive to said match indication for restarting and reinitializing said means for obtaining, said means for checking and counting, said means for supplying, said means for obtaining, repeatedly and said means for repeatedly checking; and means for supplying as an output said frame count as a frame delay indication in units of frames.

14. The apparatus as defined in claim 12 wherein said means for determining to within a predetermined probability includes means for counting a number of bits from a start of frame indication of said second digital signal until an immediately following start of frame indication of said first digital signal and supplying as an output said number as a frame offset indication in units of bits.

15. The apparatus as defined in claim 12 wherein said means for determining to within a predetermined probability includes means for converting a frame delay indication from an indication in units of frames to an indication in units of bits and means for adding said frame delay indication in units of bits to a frame offset indication in units of bits to obtain said difference in delay.

16. The apparatus as defined in claim 10 wherein said means for aligning said starting location includes:
   means for generating third and fourth digital signals each comprising a series of frames of identical type as said frames comprising said first or second digital signals, wherein said third digital signal is transporting a series of payloads identical to those transported by said first digital signal and said fourth digital signal is transporting a series of payloads identical to those transported by said second digital signal, and said third and fourth digital signals being time synchronized;
   means for reading from frames of each of said third and fourth digital signals a pointer value indicating a starting location within respective ones of said frames of a particular payload which is identical in each of said third and fourth series of payloads;
   means for performing pointer justifications on said fourth digital signal by shifting said starting location and subsequent locations of each payload in said fourth digital signal by an amount reflective of the difference between each of said read pointer values;
   means for obtaining a new pointer value for said fourth digital signal so that said new pointer value corresponds with said shifted starting location;
   means for checking said pointer values of said third and fourth digital signals for a change and for supplying as an output a change indication of whether or not a change in said pointer values of said third and fourth digital signals has occurred;
   means responsive to said change indication indicating that a change has occurred for restarting said means for reading and said means for performing; and
   means responsive to said change indication indicating that a change has not occurred for writing said new pointer value to said fourth digital signal.

17. The apparatus as defined in claim 16 further including:
   means for writing overhead bytes as required to each of said third and fourth digital signals;
   means for scrambling, as required, each of said third and fourth digital signals; and
   means for supplying as outputs said third and fourth digital signals to a signal selector for switching.

18. A system including a plurality of errorless switching apparatus as defined in claim 10 further including means for dividing said first digital signal using a byte disinterleaving technique into a first plurality of signals and means for dividing said second digital signal using said byte disinterleaving technique into a second plurality of signals wherein each of corresponding ones of said first and second plurality of signals are supplied to one of said errorless switching apparatus which operate in a synchronized manner and means for combining each of said signals supplied as an output from each of said plurality of errorless switching apparatus into a third signal using an inverse of said byte disinterleaving technique.

* * * * *